United States Patent [19]
Ogino et al.

[11] Patent Number: 4,631,798
[45] Date of Patent: Dec. 30, 1986

[54] METHOD OF PRODUCING A RELEASE AGENT APPLICATOR

[75] Inventors: Takao Ogino; Hiroo Katsuya; Chiaki Kato; Sigelu Omori, all of Osaka; Satsuki Kawauchi, Shiga; Itsuro Kato; Tsutomu Kato, both of Osaka, all of Japan

[73] Assignees: Sumitomo Electric Industries, Ltd.; Sharp Kabushiki Kaisha, both of Osaka, Japan

[21] Appl. No.: 786,360

[22] Filed: Oct. 11, 1985

Related U.S. Application Data

[63] Continuation of Ser. No. 610,649, May 16, 1984, abandoned.

[30] Foreign Application Priority Data

May 19, 1983 [JP] Japan ................................. 58-88944

[51] Int. Cl.[4] ............................................. B23P 25/00
[52] U.S. Cl. ................................ 29/458; 29/163.5 R; 29/460; 118/60; 264/127; 264/322
[58] Field of Search .................. 29/163.5 R, 458, 460; 264/48, 127, 320, 321, 322; 118/60

[56] References Cited

U.S. PATENT DOCUMENTS

| | | | |
|---|---|---|---|
| 4,359,963 | 11/1982 | Saito et al. | 118/101 X |
| 4,375,201 | 3/1983 | Kato | 118/104 X |
| 4,478,665 | 10/1984 | Hubis | 264/127 X |
| 4,482,516 | 11/1984 | Bowman et al. | 264/127 |

*Primary Examiner*—Charlie T. Moon
*Attorney, Agent, or Firm*—Staas & Halsey

[57] ABSTRACT

A release agent applicator for a copying machine in which voids in the release agent contained in the applicator are substantially eliminated, thus providing an improved spreading performance of the release agent onto a fixing roll of the copying machine. The release agent applicator is made of a porous polyethylene tetrafluoride tube, the pores of which are partially closed except in areas where the release agent is to ooze out onto the fixing roll. Those partially closed pores in the tube are partially closed by a flattening operation so that they cannot draw release agent thereinto by capillary action.

3 Claims, 6 Drawing Figures

METHOD OF PRODUCING A RELEASE AGENT APPLICATOR

This is a continuation of co-pending application Ser. No. 610,649 filed on May 16, 1984, now abandoned.

BACKGROUND OF THE INVENTION

The present invention relates to an apparatus for applying a release agent, such as silicone oil, to the fixing roll of a plain paper copying (PPC) machine.

In the conventional fixing mechanism for a PPC machine, the toner pattern transferred to copy paper is fixed to the copy paper by passing the copy paper between a heated fixing roll and an elastic pressure roll such as a rubber roll. Unfortunately, while the paper with the toner pattern is passing between the heated fixing roll and the elastic pressure roll, the paper has a tendency to stick to both of the two rolls, causing various problems such as incomplete fixing, a double image due to the adherence of toner particles to the fixing roll rather than the copy paper (this phenomenon is generally referred to as "offsetting"), and malfunction of the copying machine.

While various methods have been proposed for solving these problems, the most usual method is to apply a release agent to the fixing roll and elastic roll. However, applying a uniform coating of the release agent in the correct amount is very difficult. If the amount of the release agent is excessive, the paper may be stained. Furthermore, too rapid a consumption of the release agent requires frequent application of the agent, and if excessive amounts of the agent are present, it will solidify on the roll surface and cause problems with the copying process. If the amount of the release agent is too small, offsetting will unavoidably occur, or the resulting poor releasability from the roll surface will cause the paper to stick to the roll. Commonly used release agents are heat-resistant oils such as silicone oil.

To eliminate these defects, various release agent applicators have been proposed, but none has proved to be completely satisfactory.

One of the inventors previously invented a release agent applicator. The applicator of that invention assures uniform application of the release agent, requires a minimum consumption of the agent, and can be installed in a very small area. Furthermore, the applicator has a simple configuration, is very inexpensive, and can be thrown away after use.

As shown in FIGS. 1A, 1B and 2, the fixing apparatus of that invention basically consists of a fixing roll 14 and a pressure roll 15, between which the toner image is passed to be fused onto a copy paper 16. This apparatus is characterized in that a porous polyethylene tetraflouride resin tube 7 having both ends closed is brought into contact with the fixing roll 14 in its axial direction. A release agent 6 contained in that porous resin tube oozes out through pores of the tube to apply a thin coating of the release agent onto the roll.

In the applicator shown above, both ends of the porous tube 7 are closed by, for example, heat sealing or plugging with a stopper. Since the porous tube 7 is soft, it is carried on a support 1 (FIGS. 1A and 1B) or 4 (FIG. 2). All pores of the porous tube except those in the area which acts as an outlet for the release agent are closed with fluorine rubber or another suitable material. This is done for the purpose of discharging a predetermined and uniform amount of the release agent. The porous tube 7 may be filled with the release agent 6 before the tube is nested in the support. The applicator used for the filling operation can be thrown away after use. Alternatively, the tube may be filled with the release agent through an inlet 5 after the tube is accommodated in the support.

In FIGS. 1A, 1B and 2, reference numeral 2 represents the area of the porous polyethylene tetrafluoride resin tube where the pores are closed, and 3 refers to that area of the porous polyethylene tetrafluoride resin tube where the pores are left open.

The present inventors later found, however, that even this type of applicator has a drawback, namely, the porous tubes which are closed take in release agent due to capillary action, resulting in voids in the interior of the tube in the release agent supply.

SUMMARY OF THE INVENTION

The present invention has been accomplished to eliminate this defect. The release agent applicator of the present invention is characterized in that the pores in the porous tube, except for those which are left open to allow the release agent to ooze out, are flattened.

BRIEF DESCRIPTION OF THE DRAWINGS

FIGS. 1A, 1B and 2 illustrate a release agent applicator previously developed by one of the present inventors, of which FIG. 1A is a front view of the applicator, FIG. 1B is a cross section, and FIG. 2 is another front view; and FIGS. 3A through 3C illustrate a process for producing a porous tube used in the release agent applicator of the present invention in which unused pores have been flattened, of which FIG. 3A is a perspective view of a tube stock, FIG. 3B is a perspective schematic view of preparatory work for flattening and crushing opposite tube walls and partially closing the tube pores, and FIG. 3C is a cross-section of the finished tube.

DESCRIPTION OF THE PREFERRED EMBODIMENTS

The present invention will hereunder be described in detail with reference to the accompanying drawings.

Figure 1A:
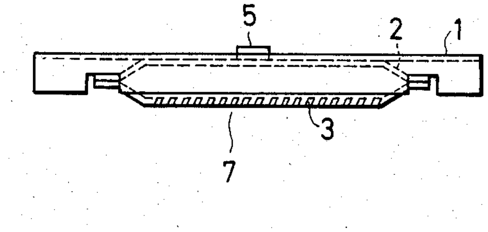
FIG. 1A PRIOR ART
Figure 1B:
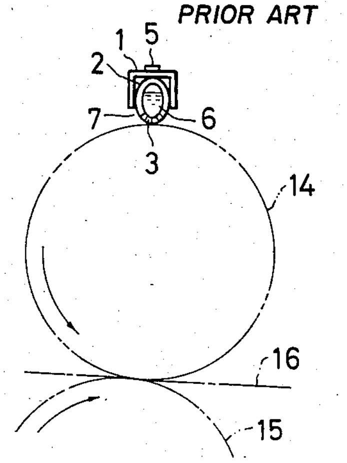
FIG. 1B PRIOR ART
Figure 2:
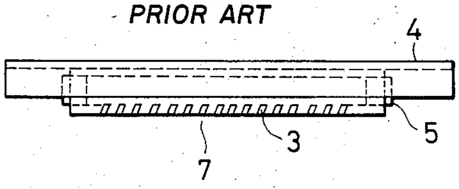
FIG. 2 PRIOR ART

In the release agent applicator of the type shown in FIGS. 1A, 1B and 2, a porous polyethylene tetrafluoride resin tube 7 is provided by extruding a polyethylene tetrafluoride resin mix containing a liquid lubricant into a tubular form, drawing the tube and sintering the same. Examples of this tube are shown in Japanese Patent Publication No. 13560/67 and Japanese Patent Application No. 155226/75, and have the following features: fine pores of a uniformly controlled size, preferably in the range of 0.1 to 10 $\mu m$; a porosity of 50 to 85%; an outside diameter of 5 to 50 mm; and a wall thickness of 0.1 to 5 mm. A commercial product having these dimensions is available from Sumitomo Electric Industries, Ltd. of Japan under the trade name "Porefuron TM".

According to the present invention, the pores in the porous tube, except at the outlet for the release agent, are partially closed by a flattening operation.

Figure 3A:
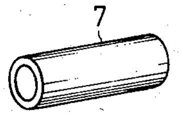
Figure 3B:
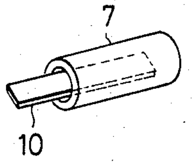
Figure 3C:
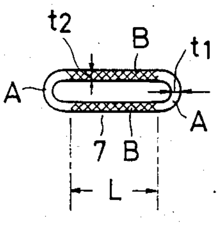

The flattening operation can be performed by a sequence shown in FIGS. 3A through 3C. Into the porous tube 7 (FIG. 3A), a plate 10 is inserted (FIG. 3B), and the tube is pressed from top and bottom by means of a press or rollers. In FIG. 3C, the connecting edge portions of the porous tube where the pores are left intact is indicated by A, and the opposite flattened and crushed sides wherein the pores are partially closed is denoted by B. The intact area A is used as the outlet for the release agent.

By flattening and crushing opposite tube walls, the unused pores as shown above, voids in the release agent supply are minimized, and more effective use of the release agent is assured.

Experimental data is hereunder given for a better understanding of the present invention.

(1) Before flattening pores:

(a) Porous tube structure: Porefuron TM tube, I.D. 12 mmϕ, O.D. 14.4 mmϕ, wall thickness 1.1 mm, length 275 mm, porosity 72–78%, pore size 1.5 μm (b) Inner capacity of the porous tube when installed in the housing: 23 cc (c) Dead space or amount of silicone oil held in the pores: 10 cc (2) After flattening pores:

(a) As shown in FIGS. 3A through 3C, the porous tube was pressed to a thickness of 0.5 mm ($t_1$=1.1 mm, $t_2$= 0.5 mm, L=16 mm in FIG. 3C).

(b) The inner capacity of the tube increased by 2 cc, and the amount of oil held in the pores decreased by 4 cc.

The foregoing data illustrates that an effective increase of 6 cc in the amount of the oil was attained.

In view of the foregoing, the present invention permits more of the release agent to be used effectively without increasing the size of the porous tube. That is, there is an increase in the amount of the release agent that can be used effectively. As resultant advantages, the cost of materials and the overall size of the applicator are reduced. The flattening of pores necessary for achieving these advantages can be effected by a simple and very economical method.

We claim:

1. A method for producing a release agent applicator for use with a copying machine in which a release agent is applied onto a fixing roll in the copying machine through a porous wall polyethylene tetrafluoride tube, comprising the steps of:

(a) preparing said porous wall tube formed of polyethylene tetrafluoride;

(b) inserting a plate into said tube;

(c) pressing said tube against opposite sides of said plate to flatten and crush said tube wall against the opposite sides of said plate and partially close said pores in said porous tube that was flattened and crushed against said opposite sides of said plate while leaving open the pores in connecting edge portions between said opposite flattened sides of said porus tube wall;

(d) removing said plate from said flattened tube; and (e) mounting said flattened and crushed tube within a support with an open pore connecting edge portion thereof exposed to permit release agent to flow through the open pores and onto said fixing roll.

2. The method of claim 1, further comprising the step of sealing both ends of said tube after said tube is filled with said release agent.

3. The method of claim 1, further comprising the step of sealing both ends of said tube before said tube is filled with said release agent.

* * * * *